United States Patent
Ransford et al.

(10) Patent No.: US 6,532,087 B1
(45) Date of Patent: *Mar. 11, 2003

(54) MULTIPLE SIGNAL Q-TESTER

(75) Inventors: Michael J. Ransford, Arnold, MD (US); Minh T. Nguyen, Laurel, MD (US); Michael G. Taylor, Laurel, MD (US); Jeffrey C. Livas, Millersville, MD (US); Vipul Bhatnagar, Kensington, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/306,008

(22) Filed: May 6, 1999

Related U.S. Application Data (63) Continuation-in-part of application No. 09/161,978, filed on Sep. 29, 1998, now Pat. No. 6,351,322, which is a continuation-in-part of application No. 09/124,092, filed on Jul. 29, 1998, now abandoned.

(51) Int. Cl.[7] .......................... H04B 10/06; H04B 10/08
(52) U.S. Cl. ....................... 359/110; 359/187; 359/177; 359/193
(58) Field of Search ................................ 359/110, 133, 359/187, 177, 193

(56) References Cited

U.S. PATENT DOCUMENTS

| | | | | |
|---|---|---|---|---|
| 4,726,011 A | * | 2/1988 | Ih et al. ...................... 359/127 |
| 4,989,202 A | * | 1/1991 | Soto et al. ................... 370/244 |
| 5,822,102 A | * | 10/1998 | Bodeep et al. .............. 359/125 |
| 5,940,209 A | * | 8/1999 | Nguyen ....................... 359/124 |
| 6,061,158 A | * | 5/2000 | DeLong ....................... 359/133 |
| 6,134,034 A | * | 10/2000 | Terahara ..................... 359/124 |
| 6,229,631 B1 | * | 5/2001 | Sato et al. ................... 359/110 |
| 6,259,543 B1 | * | 7/2001 | Golovchenko et al. ..... 359/110 |
| 6,172,782 B1 | * | 1/2002 | Kobayashi ................... 359/128 |

* cited by examiner

Primary Examiner—Leslie Pascal
(74) Attorney, Agent, or Firm—Daniel N. Daisak; Michael R. Cammarata (57) ABSTRACT

An apparatus and method are provided for monitoring the Q-factor of a plurality of main signals that are simultaneously transmitted across a fiber optic line using wave division multiplexing. In particular, the includes an optical tap, a tunable optical bandpass filter, and a Q-detection circuit. The optical tap operates to tap the fiber optic line to provide a plurality of tapped signals corresponding to the plurality of main signals. The tunable optical bandpass filter acts to select one of the plurality of tapped signals, by only passing a selected signal in a chosen channel frequency band. The Q-detection circuit then determines the Q-factor of the selected signal. This operation can be performed sequentially for each of the plurality of tapped signals to provide a measure of the Q-factor for each of the plurality of main signals. This operation can also be continually repeated to provide a constant measurement of the Q-factor of each of the plurality of main signals.

20 Claims, 4 Drawing Sheets

MULTIPLE SIGNAL Q-TESTER

This application is a Continuation-in-part application of a Q DETECTION CIRCUIT, by Mike Ransford, et al., Ser. No. 09/161,978, filed on Sep. 29, 1998 and that issued on Feb. 26, 2002 as U.S. Pat. No. 6,351,322, which is a continuation-in-part of application Ser. No. 09/124,092 to a Q DETECTION CIRCUIT, by Ransford, et al., filed Jul. 29, 1998 (now abandoned), the contents of both of which are hereby incorporated by reference in their entirety.

BACKGROUND OF THE INVENTION

The present invention relates to a system for providing a measure of the clarity of a signal on a multiplexed fiber optic transmission line. More particularly, the present invention relates to a system for continually scanning for the Q-factor of multiple signals, individually and sequentially, being transmitted along a single fiber optic line.

In any transmission system, including optically transmitted systems, it is desirable to know the accuracy of the transmitted data at the receiver, i.e., the end of the system. In a digital system, the transmitted signal comprises a plurality of 1's and 0's, i.e., a plurality of high and low signals. Thus, errors in transmission occur when these 1's and 0's are not properly identified by the receiving circuit.

The digital values "1" and "0" each have an ideal voltage associated with it depending upon the parameters of the transmission circuit. Since no system is completely ideal, however, the actual 1's and 0's being transmitted will run through a range of voltages around the ideal voltages. For this reason, the ideal voltage can also be referred to as a mean voltage $\mu$, since it is the average voltage transmitted for a given digital value. The distribution of these voltages will either be Gaussian or at least a close approximation of Gaussian for the range of interest.

Figure 1:
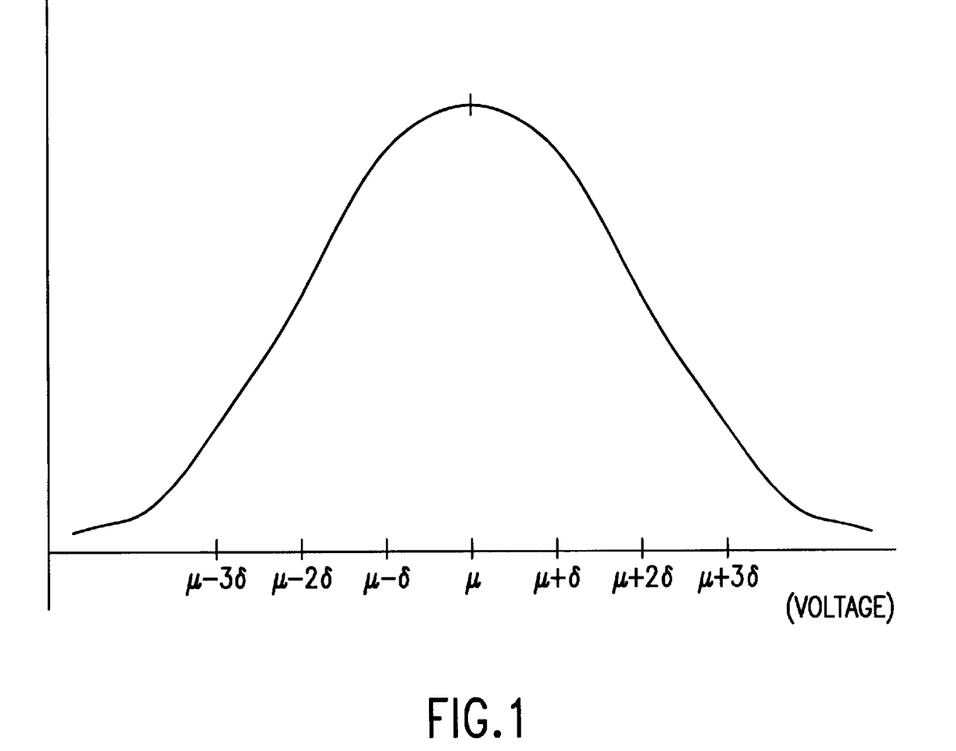
FIG. 1 is a graph showing a Gaussian distribution of received voltages around a mean voltage for an optical transmission network.

This means that the distribution of voltages transmitted as a particular value, i.e. "1" or "0," will fall into at least an approximation of a Bell curve, as shown in FIG. 1. As shown in FIG. 1, for a given digital value, i.e. "1" or "0," half of the transmitted voltages will fall above the mean voltage $\mu$, half will fall below the mean voltage $\mu$, and a majority will fall within three standard deviations $3\sigma$ of the mean voltage $\mu$.

In a given system, therefore, it is necessary to set some threshold voltages for the 1's and 0's, i.e., HIGH and LOW thresholds, to allow a decision circuit to determine what will be identified as received 1's and 0's. The closer these thresholds are to the mean voltage $\mu$, the greater the error rate will be, and the farther away, the lower the error rate will become.

The accuracy of the transmitted signals can be determined by a statistic called the bit error rate (BER). The BER is the number of errors per bit transmitted, and depends upon the decision threshold. Another indicator of the accuracy of transmission can be given by the transmission's Q-factor. The Q-factor is an indicator of the signal quality at the decision circuit.

While the BER is easy to understand, the Q-factor is generally considered a more useful indicator of the accuracy of a transmission circuit, because it can be used to characterize the signal quality under conditions in which it is not practical to measure the BER. For this reason, it is preferable to determine a circuit's Q-factor rather than its BER. The Q-factor is related to the BER at the optimal threshold setting by the following formula:

$$BER = \frac{1}{2}\mathrm{erfc}\left(\frac{Q}{\sqrt{2}}\right) \approx \frac{1}{2}\left[\frac{1}{(\sqrt{2\pi})Q} \times e^{-\frac{Q^2}{2}}\right] \quad (1)$$

$$BER \approx \frac{1}{2}\left[\frac{1}{\sqrt{2\pi}} \times \frac{1}{Q} \times e^{-\frac{Q^2}{2}}\right] \quad (2)$$

As a result, it is possible to determine the Q-factor of a signal by first measuring BER versus threshold for both "1s" and "0s", and then fitting the results to extract the Q-factor.

This relationship is helpful, since the BER is more readily measured than the Q-factor. To measure the BER of a signal a measuring circuit need only monitor an incoming circuit for errors and determine how frequent the errors are. The accuracy of an error count is roughly $\sqrt{N}$, so a rule of thumb is that 10 errors causes an uncertainty of 3%.

In conventional optical transmission systems, BERs of $10^{-15}$, i.e., one error per 1,000,000,000,000,000 bits transmitted, are typical. These low BERs lead to one significant problem. Given the small number of errors, it is extremely difficult to actually measure the BER of an optical system in an efficient manner. Since an accurate BER measurement (3% uncertainty) requires the measuring circuit to detect ten individual errors it is necessary to run the measuring circuit for a sufficient period of time for ten errors to pass through. This means that with a BER of $10^{-15}$, the detection circuit would have to actually detect 1016 data bits before it detected the ten errors required for an accurate BER measurement. For an optical system that can transmit $2.488 \times 10^9$ bits per second (i.e., OC48), it would take nearly $4 \times 10^6$ seconds, or 46 days, for ten errors to be detected, and thus for the BER to be accurately determined.

In addition, many times optical fibers transmit more than one signal along a single multiplexed fiber. Just as it is desirable to determine the Q-factor of a single signal, and thus its BER, it is just as important to determine the Q-factor of each of the multiple signals transmitted over a multiplexed fiber optic line. However, the problems noted above associated with BER measurements are increased as the number of multiplexed signals grows.

If the signals are to be monitored sequentially, the time required for testing the BER will be multiplied by the number of signals multiplexed on the fiber optic line, further exaggerating the unreasonably long time required for an accurate measurement of BER. And even if the measurements were performed in parallel, the time required for determining the BER would remain unreasonably long, while the equipment costs for the testing device would increase dramatically. Thus, even using the most efficient and expensive approach, it would still require a month and a half to accurately obtain an accurate measurement of the BER of all of the multiplexed signals being transmitted over the fiber optic line.

This is too long a time for any effective testing circuit to employ such a method. As a result, it is extremely difficult to measure the true BERs for the threshold voltages used in optical transmission systems, and thus similarly difficult to determine the systems' Q-factors. It is therefore desirable to have a way of easily determining the BER or Q-factor for single-signal or multiplexed fiber optic lines without having to wait over a month for each test sample.

One possible method of estimating BER was suggested in detail in "Margin Measurements in Optical Amplifier Systems," by Neal S. Bergano, et al., IEEE Photonics Technology Letters, Vol. 5, No. 3, March, 1993, ("Bergano et al.") the contents of which are herein incorporated by reference. Bergano et al. observes that high values of BER can be easily measured and plotted against their respective threshold voltages. If several measurements are taken of high BER values and plotted against the median voltage on a logarithmic scale, the resulting curve is a close approximation of a straight line. Bergano et al. then suggests plotting one line for the threshold for 1's transmitted through the optical system and another line for 0's transmitted through the optical system.

The point at which these two lines intersect will be the point where the optimal threshold voltage is for marking the difference between 1's and 0's, and will show the BER for that threshold voltage. In this way, the BER can be quickly determined for an ideal threshold voltage, even if the time required to actually confirm that BER would be great. Using Bergano et al.'s method, measurements need only be taken for several larger BER's, which will take a dramatically shorter amount of time.

However, Bergano et al. does not suggest any circuitry for implementing this method, nor does it address the problems inherent in implementing the method into a physical circuit. In addition, Bergano et al. concerns itself with a single signal transmission, and so fails to address the problems associated with multiplexed fiber optic lines.

It is therefore desirable to provide a functional circuit that can provide an accurate reading of the actual BER for both incoming 1's and 0's and accurately extrapolate an optimal threshold voltage and associated BER value for that threshold. It is also desirable to provide a functional circuit that can determine the associated Q-factor for the BER associated with the optimal threshold voltage for an individual signal. It is further desirable to provide a functional circuit that can quickly and accurately determine the Q-factor for a plurality of signals being transmitted across a single fiber optic line.

SUMMARY OF THE INVENTION

It is thus an object of the present invention to provide a circuit for determining the Q-factor an optical communication system in an accurate fashion.

In particular, it is an object of this invention to provide a test instrument that will measure the Q-factor of an optical communication system by first determining the optimal BER and threshold voltage of the system, and then using the optimal BER to calculate the optimal Q-factor.

It is another object of this invention to provide a test instrument that will measure the Q-factor of a plurality of signals transmitted across a single fiber optic line by sequentially determining the optimal BER and threshold voltage for each signal, and then using the optimal BER to calculate the optimal Q-factor for each signal.

In accordance with these objects, a circuit for monitoring the Q-factor of a plurality of main signals being simultaneously transmitted across a fiber optic line is provided, the circuit comprising: an optical tap for tapping the fiber optic line to provide a plurality of tapped signals corresponding to the plurality of main signals, a filter for selecting one of the plurality of tapped signals, and a Q-detection circuit for determining the Q-factor of the selected signal.

The plurality of main signals may be transmitted over the fiber optic line using wave division multiplexing. The wave division multiplexing may, for example, use 100 MHZ spacings and employ 16 channels, or it may use 50 GHz spacings and employ between 40 and 96 channels.

The filter may be a tunable optical bandpass filter. The tunable optical bandpass filter may cycle through a plurality of channel frequency bands respectively associated with the plurality of tapped signals, allowing the Q-detection circuit to determine the Q-factor for each of the plurality of tapped signals in turn. The tunable optical bandpass filter may also continually cycle through the plurality of channel frequency bands, thereby providing a constant stream of selected signals to the Q-detection circuit.

The optical tap may be a 1% to 5% tap, providing the tapped signals with an amplitude of 1% to 5% of the amplitude of the main signals. More specifically, the optical tap may be a 2% tap, providing the tapped signals with an amplitude of 2% of the amplitude of the main signals.

The Q-detection circuit may itself comprise: a first variable attenuator for attenuating the selected signal in response to a first attenuator control signal, a first optical-to-electrical converter for converting a first portion of the attenuated signal into an electrical data signal, a second optical-to-electrical converter for converting a second portion of the attenuated signal into a first power indication signal, a decision circuit for detecting high and low data bits in the electrical data signal based on a plurality of threshold voltage signals, and for providing decision signals indicative of the results of these determinations, an error monitoring circuit for receiving the decision signals, determining the bit error rate of the incoming optical signal for the plurality of threshold. voltages, and providing bit error rate signals, and a microprocessor for receiving the power regulation signal and the bit error rate signals, and for generating a first attenuator control signal and a plurality of threshold voltage signals. In this case, the variable attenuator operates to attenuate the selected signal such that it is at an optimal input level for the operation of the first optical-to electrical converter, and the microprocessor determines an optimal bit error rate and an optimal Q-factor for the selected signal based on the bit error rates of the selected signal for the plurality of threshold voltages.

In addition, a method for monitoring the Q-factor of a plurality of main signals being simultaneously transmitted across a fiber optic line is also provided, the method comprising: tapping the fiber optic line to provide a plurality of tapped signals corresponding to the plurality of main signals, selecting one of the plurality of tapped signals, and determining the Q-factor of the selected signal.

The plurality of main signals may be transmitted over the fiber optic line using wave division multiplexing. The wave division multiplexing may, for example, use 100 MHZ spacings and employ 16 channels, or it may use 50 GHz spacings and employ between 40 and 96 channels.

The selection of one of the plurality of tapped signals is preferably performed by filtering the plurality of tapped signals so that only a tapped signal in a particular channel frequency band is selected. The method may repeat the selection of one of the plurality of tapped signals and the determination of the Q-factor of the selected signal through a plurality of channel frequency bands respectively associated with the plurality of tapped signals, allowing for the determination of the Q-factor for each of the plurality of tapped signals. The method may also continually repeat the selection of one of the plurality of tapped signals and the determination of the Q-factor of the selected signal, thereby continually and sequentially determining the Q-factor associated with each of the plurality of tapped signals.

Preferably, the tapped signals have an amplitude of 1% to 5% of the amplitude of the main signals. More preferably, the tapped signals have an amplitude of 2% of the amplitude of the main signals.

The determination of the Q-factor of the selected signal may itself comprise: attenuating the selected signal to a desired intensity, converting the attenuated signal to an electrical signal, determining the value of each of the data bits for each of a plurality of threshold voltages, determining a 1-bit error rate for identifying bits having a value of '1' in the step of determining the value of each of the data bits, determining a 0-bit error rate for identifying bits having a value of '0' in the step of determining the value of each of the data bits, approximating a 1-bit error line of the logarithm of the 1-bit error rate versus the threshold voltage, approximating a 0-bit error line of the logarithm of the 0-bit error rate versus the threshold voltage, determining an intersection point at which the 1-bit error line and the 0-bit error line cross, determining the ideal bit error rate corresponding to the intersection point, and calculating the Q-factor corresponding to the determined ideal bit error rate.

BRIEF DESCRIPTION OF THE DRAWINGS

The above and other objects and advantages of the present invention will become readily apparent from the description that follows, with reference to the accompanying drawings, in which.

DETAILED DESCRIPTION OF THE PREFERRED EMBODIMENTS

Figure 2:
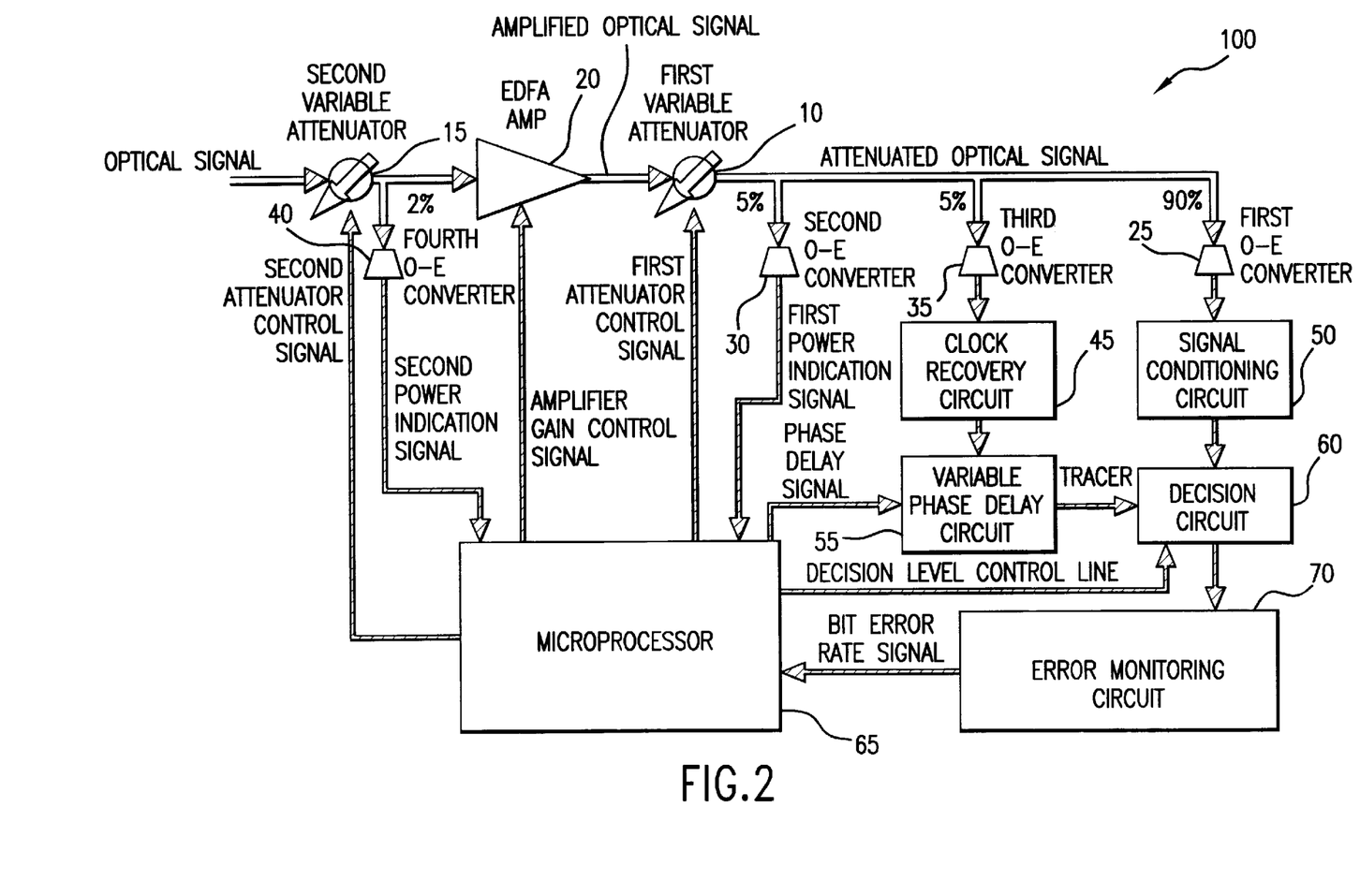
FIG. 2 is a block diagram of a testing circuit for determining the Q-factor of an optical communication system according to a first preferred embodiment.

FIG. 2 is a circuit diagram of a testing circuit 100 for determining the Q-factor of an optical communication system according to a first preferred embodiment. This testing circuit 100 first determines the bit error rate (BER) of the circuit and then calculates the related Q-factor based on the determined BER using equation (1) from above. The testing circuit 100 includes first and second variable attenuators 10 and 15, an erbium-doped fiber amplifier (EDFA) 20, first through fourth optical-to-electrical converters 25, 30, 35, and 40, a clock recovery unit 45, a signal conditioning unit 50, a variable phase pulse delay unit 55, a decision circuit 60, a microprocessor 65, and an error monitoring circuit 70. In FIG. 2, the optical path is shown by the hollow lines, while all electrical connections are shown by solid lines.

The testing circuit 100 receives an optical signal over the optical path at the second variable attenuator 15. The fourth optical-to-electrical converter 40 taps 2% of the optical output of the second variable attenuator 15, while the input of the EDFA 20 receives the remaining 98%. The EDFA supplies all of its optical output to the first variable attenuator 10. Of the output of the second optical attenuator 15, 5% is tapped by the second optical-to-electrical converter 30, 5% is tapped by the third optical-to-electrical converter 35, and the remaining 90% is sent to the first optical-to-electrical converter 25.

The optical signal received by the testing circuit comprises a plurality of bits, each having a value of either '1' or '0.' Each of these bits is represented by a signal of varying intensity, with the 1-bits being distributed around an ideal HIGH intensity and the 0-bits being distributed around an ideal LOW intensity. When the optical signal is converted into an electrical signal by the first optical-to-electrical converter 25, these 1-bits and 0-bits are then represented by analog signals comprising a plurality of bits. The plurality of bits each have varying voltages with the 1-bits being distributed around an ideal HIGH voltage and the 0-bits being distributed around an ideal LOW voltage.

The electrical signals received from the first optical-to-electrical converter 25 are adjusted in accordance with the electrical parameters of the signal conditioning circuit 50 and the decision circuit 60. The decision circuit 60 then takes each bit contained in the electrical signal and determines whether each is a '1' or a '0' by comparing the voltage of the bit with a particular threshold voltage at every falling clock edge as determined by the clock recovery circuit 45. If the voltage of the bit is above the threshold voltage, the bit is designated as a '1.' If the voltage of the bit is below the threshold voltage, the bit is designated as a '0.' The threshold voltage of the decision circuit 60 is determined by the microprocessor 65 and is controlled via a threshold voltage control signal sent over the decision level control line.

The closer the threshold voltage is to the ideal HIGH voltage, the more likely the decision circuit 60 is to identify incoming bits as having a value of '0.' This means that for high threshold voltages, the circuit will properly identify most 0-bits, since they will almost all be below the threshold voltage, and will misidentify a larger number of 1-bits as 0-bits, since a larger number of low-range voltages for 1-bits will be below the threshold voltage. In an extreme case, if the threshold voltage were chosen to be equal to the ideal HIGH voltage, an error rate of 0.5 for identifying 1-bits (one error every two bits) would be expected, since half of the 1-bits should have voltages distributed below the ideal HIGH voltage. In addition the error rate for identifying 0-bits would be extremely low, since most 0-bits will have their voltage below the ideal HIGH voltage. This would result in a BER of about 0.5 once the two separate error rates were combined. A similar argument is applicable for threshold voltages that approach the ideal LOW voltage.

The manner in which the testing circuit 100 actually checks for errors is through the use of a parity bit. The optical signal received along the optical path is preferably a SONET transmission signal, comprising a plurality of SONET packets. Since each packet in a SONET transmission includes a parity bit, it is possible to detect whether there have been an odd number of errors in each packet by monitoring the packet's parity bit. In the testing circuit 100, the error monitoring circuit 70 receives the bits from the decision circuit 60 and categorizes them into SONET packets. The error monitoring circuit 70 then identifies the parity bit in each packet and checks the parity of the packet to determine if it is correct. If not, it then notes the error and sends a notification of that error to the microprocessor 65.

Because of the limited information carried in the parity bit, however, the testing circuit 100 is limited to detecting BERs that are no more frequent than once per SONET packet. If the errors were more frequent, they could not be accurately detected by the parity bit. The parity bit only tells whether there is an odd number of errors in the packet, with no way to discriminate between one error and any other odd number of errors. An even number of errors would result in correct parity, with the errors canceling each other out. In the preferred embodiment, this means that the testing circuit 100 limits itself as an upper BER boundary to testing parameters in which the BER is no greater than $10^{31}$ $^6$, or one error per $10^6$ bits, since there are $10^6$ bits in each SONET OC48 data packet.

Although in the preferred embodiment, a SONET data packet is used, and error checking is performed using the parity bit in the SONET data packet, other implementations are certainly possible. A standard pseudo-random pattern may be used for transmission and in this case a full pattern check can be performed to check for errors. This method is limited since now it is necessary to know the content of the full transmitted pattern to check for errors. In comparison, in the preferred embodiment, it is possible to monitor any SONET signal regardless of the data payload.

As to the lower BER boundary, the first preferred embodiment has no physical limits. However, for practical purposes, a software limit can be chosen so that no single error measurement will take more than 40 seconds. Given the data transmission rate, any lower BER would require greater than 40 seconds to detect ten errors, the minimum for a valid BER measurement. Therefore, for the reasons given above, the threshold voltages are chosen to produce bit error rates between $10^{-6}$ and $10^{-11}$. For alternate embodiments, different boundary conditions can obviously be chosen.

The operation of the system of FIG. 2 is as follows. Starting with the decision threshold voltage at the middle point of the voltage range, the threshold voltage is moved up incrementally towards the ideal value of the '1' marker (or the 'mark') until 4 valid points are obtained. A valid point is obtained when the BER is within the acceptable range and at least ten errors are identified within the 40 seconds allowed for each sample.

Then, the threshold voltage is returned to its middle value and the threshold voltage is moved down incrementally towards the ideal value for the '0' marker (or the 'space') until four additional valid points are obtained. Again, a valid point is obtained when the BER is within the acceptable range and at least ten errors are identified within a the 40 seconds allowed for each sample.

These measured points are then plotted on a logarithmic graph and a best-fit line is drawn for each set of points. Based on the BERs computed for the varying threshold voltages, the microprocessor 65 then extrapolates the curves of BER versus threshold voltage for both incoming 1-bits and 0-bits and determines where the two curves cross. The optimal BER and decision threshold voltage for the system are determined by the point where these two lines intersect. The Q-factor is then determined from the optimal BER using equation (1) given above.

Since the function of the circuit is to gain an accurate detection of the BER of an incoming optical signal, it is necessary to minimize as many noise sources as possible within the detection circuit itself. One source of noise can arise from the first optical-to-electrical converter 25. If the signal supplied to the first optical-to-electrical converter 25 is too low, additional noise may be generated that could distort the Q measurement made by the circuit. If the signal is too high, some of the noise may actually be removed by the reconditioning circuit 50. Preferably, the optical signal coming into the first optical-to-electrical converter 25 will be set at a predetermined ideal input level.

The first and second variable attenuators 10 and 15, the EDFA 20, the second and fourth optical-to-electrical converters 30 and 40, and the microprocessor 65 operate to regulate the signal coming into the first optical-to-electrical converter 25 to keep it at the ideal input level. Specifically, the first variable attenuator 10 regulates the output of the EDFA 20 such that the input of the first optical-to-electrical converter 25 is at the ideal input level. Since the first optical-to-electrical converter 25 receives only 90% of the output of the first variable attenuator 10, this means that the EDFA 20 must amplify the incoming signal sufficiently such that 90% of the largest possible output of the first variable attenuator 10 is equal to the ideal input level.

For LOW signals, this is not a problem. However, HIGH signals may bring the EDFA 20 into saturation, causing the introduction of noise to the signal. The circuit solves this problem by having the second variable attenuator 15 reduce the power level of the input signal such that it will not saturate the EDFA 20.

The microprocessor 65 controls the operation of the first and second variable attenuators 10 and 15 and the EDFA 20, using signals received from the second and fourth optical-to-electrical converters 30 and 40. The fourth optical-to-electrical converter 40 taps 2% of the optical signal received from the second variable attenuator 15, converts it to an electrical signal and provides that signal to the microprocessor 65. The microprocessor then uses this signal to control the second variable attenuator 15 and the EDFA 20 via the second attenuator control signal and the amplifier gain control signal to avoid saturating the EDFA 20.

The second optical-to-electrical converter 30 taps 5% of the output of the first variable attenuator 10 and provides it as a signal to the microprocessor 65. The microprocessor 65 uses this signal to adjust the operation of the EDFA 20 and the first variable attenuator 10 to ensure that the signal received at the first optical-to-electrical converter 25 is at the optimal attenuation.

The third optical-to-electrical converter 35, the clock recovery circuit 45, and the variable phase delay circuit 55 operate to provide the decision circuit 60 with a clock signal necessary for it to perform its function. The clock recovery circuit takes the SONET signal received from the third optical-to-electrical converter 35 and converts it into a clock signal. The clock recovery circuit 45 is able to do this since the packets in the SONET signal are sent in a framed pattern with a known frequency. After receiving a clock signal from the clock recovery circuit 45, the variable phase delay circuit 55 offsets the phase of the clock to put it in the proper phase for use by the decision circuit 60.

Although in alternate embodiments a separate clock generator may be used, it is preferable that the incoming signal itself be used for clock generation. Using the incoming SONET signal is both cheaper and more efficient. It is cheaper because it requires a minimum of additional circuitry. It is more efficient because any factors that shift the phase of the data stream will also shift the clock signal in exactly the same manner. This avoids the need for any complicated synchronization circuitry.

However simply detecting the Q-factor of an individual signal is of limited use in larger fiber optic transmission systems, since most systems transmit multiple signals at a time. And despite the fact that these individual signals are being transmitted along a single fiber optic pathway, each individual signal should be monitored for accuracy. It is therefore necessary to provide a means for monitoring the Q-factor of multiple signals being transmitted across a single system.

One example of a multiple transmission system is a wave division multiplexed (WDM) system. In a WDM system, a plurality of individual signals are each transmitted across a single fiber optic line at different frequencies. A fiber optic line has a number of available channels, corresponding to the different frequencies that can be used for transmission. In conventional WDM systems, the BER is generally lower than $10^{-15}$.

It is desirable to continually and sequentially determine the performance of each of the channels in a wave division multiplexed system. As noted above, one primary indicator of signal performance is the BER of the signal. However, since the BER of signals in a WDM system can be $10^{-15}$ or lower, it is more desirable to determine the Q-factor of one of the WDM signals than the BER. At a BER of $10^{-15}$, it would take weeks to accurately measure the BER of one individual signal, much less the multitude of signals being transmitted across the WDM system, while a determination of the Q-factor can be made in minutes.

Figure 3:
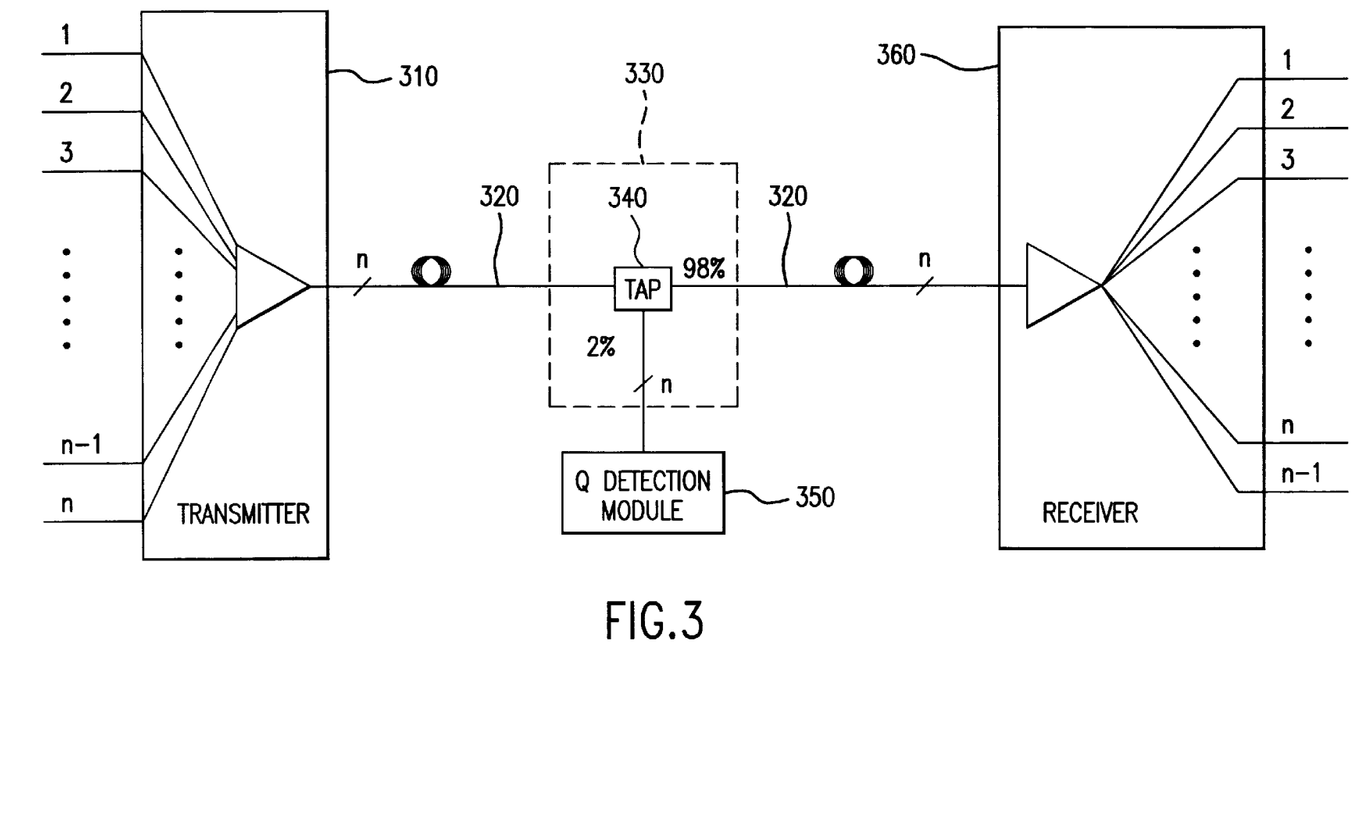
FIG. 3 is a block diagram of a wave division multiplexed system including a Q-detection module for determining the Q-factor of signals transmitted across multiple channels of the wave division multiplexed system, according to a preferred embodiment of the present invention.
Figure 4:
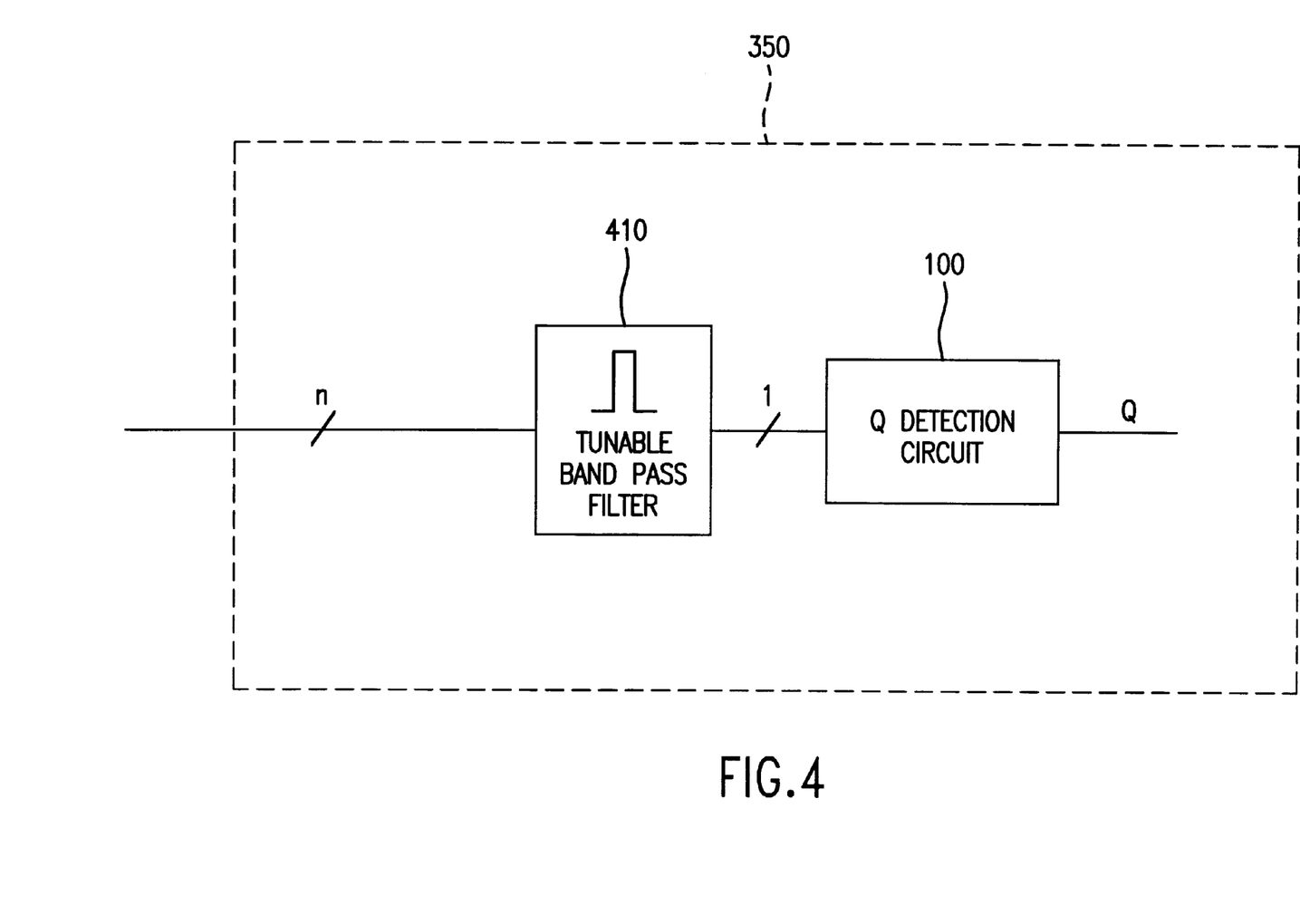
FIG. 4 is a block diagram of the Q-detection module shown in FIG. 3, according to a preferred embodiment of the present invention.

FIGS. 3 and 4 show a preferred embodiment of a WDM system including a Q-detection module for determining the Q-factor for signals transmitted across multiple channels of the WDM system. In particular, FIG. 3 is a block diagram of a wave division multiplexed system including the Q-detection module, according to a preferred embodiment of the present invention.

As shown in FIG. 3, the WDM system 300 includes a WDM transmitter 310, a fiber optic line 320, an amplifier 330 including an optical tap 340, a Q-detection module 350, and a WDM receiver 360. The WDM transmitter 310 operates to receive a plurality of individual signals 1 to n and transmit them via a WDM scheme along the fiber optic line 320. The WDM transmitter 310 shifts the frequency of each individual signal 1 to n such that each has a unique frequency corresponding to the available channels in the WDM system 300.

In the preferred embodiment, the WDM system uses 100 MHZ spacings for each channel, allowing the transmission of 16 channels. However, in alternate embodiments, other spacings can be used to allow more or fewer transmission channels. For example, a 50 GHz spacing can be used to allow 40 or 96 channels.

The WDM receiver 360 is connected to the opposite end of the fiber optic line 320 as the WDM transmitter 310, and operates to extract the plurality of signals 1 to n from the WDM signal being transmitted across the line 320. The WDM receiver 360 takes the signals from each channel in the WDM system 300 and converts them to a standard short reach SONET signal according to ITU-GR253.

The amplifier 330 is an amplifier used to refresh the WDM signals being transmitted across the WDM system 300. While only a single amplifier 330 is shown in FIG. 3 by way of example, a plurality of amplifiers 330 may be placed along the fiber optic line 320 in the WDM system. In the preferred embodiment, each of the amplifiers 330 contains an optical tap 340 for tapping off a small percentage of the WDM signals being transmitted across the fiber optic line 320.

However, the use of an optical tap 340 contained in an amplifier 330 is not required. Although in the preferred embodiment an optical tap 340 provided in the amplifier 330 is used, an optical tap 340 separate from an amplifier 330 can be used and still remain within the scope of the present invention.

Preferably, the optical tap 340 is a 2% tap, which only draws off 2% of the transmitted signal, allowing 98% of the signal to remain in the transmission channel of the WDM system 300. However, other varieties of optical taps 340 may be used. Commercially available optical taps can be easily obtained that tap off 1%, 2%, 5%, 10%, or 33%, and custom optical taps can be produced that tap other percentages of the WDM signal.

The tapped signal obtained by the optical tap 320 is provided to a Q-detection module 350, which operates to determine the Q-factor of each of the individual signals being transmitted in the various channels of the WDM system 300. This Q-factor can then be used to calculate the BER of the individual signals, giving an indication of the accuracy and performance of the individual signals, and thus of the accuracy and performance of the entire WDM system 300.

FIG. 4 is a block diagram of the Q-detection module shown in FIG. 3, according to a preferred embodiment of the present invention. As shown in FIG. 4, the Q-detection module includes a tunable optical bandpass filter 410 and a Q-detection circuit 100.

The tunable optical bandpass filter 410 receives the n individual signals contained in the WDM signal, each having a unique frequency, and operates to extract a single individual signal from these n signals. The tunable optical band pass filter 410 performs this operation by adjusting its parameters such that it matches the frequency of a single channel of the WDM system 300, and so will only allow the frequency of the chosen individual signal to pass through it to the Q-detection circuit 100.

The Q-detection circuit 100 receives the filtered individual signal and determines the Q-factor for that signal as discussed above with reference to FIG. 2. The Q-factor determined by the Q-detection circuit can then be used to show the signal quality of the chosen individual signal, either as a simple measure of the Q-factor, or by determining the BER for the individual signal from the Q-factor, as described above. The signal from the Q-detection circuit can therefore be provided to a microprocessor or other circuit for later or concurrent processing.

The tunable optical bandpass filter 410 preferably cycles continually through all of the channels used in the WDM system 300. As a result, the Q-detection circuit 100 will sequentially test for the Q-factor of each individual signal being transmitted across the WDM system 300, and will then repeat the process. The tunable optical bandpass filter 410 may be, for example, a JDS TB9 optical grating filter, or any similarly-operating optical bandpass filter.

By making these Q-factor measurements for each of the individual signals transmitted across the WDM system 300, the Q-detection module 350 can sequentially and continually provide an indication of the performance of each channel in the optical WDM system 300. Furthermore, this measurement of accuracy can be provided during system use, i.e., while the signals are being transmitted, rather than requiring the system to be shut down for testing.

Because a Q-detection circuit 100 is used, rather than a BER-detection circuit, bit error rates as low as $10^{-15}$ or lower can be identified. And, because the Q-detection is performed at a point within the transmission route of the WDM system 300, all of the channels can be unobtrusively and easily monitored from the same position.

Also, because Q-detection module 350 can be placed anywhere that an optical tap 340 is present, the performance of the WDM system 300 can be monitored at various points along the signal transmission path. This allows for monitoring to determine if there is any particular degradation along a specific span. Furthermore, since in the preferred embodiment each amplifier 330 in the WDM system contains an optical tap 340, a Q-detection module 350 can be easily employed anywhere that an amplifier 330 is present, without the need to make expensive or difficult modifications to the WDM system 300.

In the preferred embodiment, the WDM signal includes 16 individual signals. However, a WDM signal containing any number of individual signals may be used and still remain within the scope of the invention.

In addition, although the Q-detection circuit 100 shown in FIG. 2 is used in the preferred embodiment, alternate designs for a Q-detection circuit 100 used in the Q-detection module 350 may be employed in alternate embodiments.

The present invention has been described by way of a specific exemplary embodiment, and the many features and advantages of the present invention are apparent from the written description. Thus, it is intended that the appended claims cover all such features and advantages of the invention. Further, since numerous modifications and changes will readily occur to those skilled in the art, it is not desired to limit the invention to the exact construction and operation ad illustrated and described. Hence, all suitable modifications and equivalents may be resorted to as falling within the scope of the invention.

What is claimed is:

1. A circuit for monitoring the Q-factor of a plurality of main signals being simultaneously transmitted across a fiber optic line, the circuit comprising:
   an optical tap for tapping the fiber optic line to provide a plurality of tapped signals corresponding to the plurality of main signals;
   a filter for selecting one of the plurality of tapped signals; and
   a Q-detection circuit for determining the Q-factor of the selected signal,
   wherein the Q-detection circuit includes:
      a first variable attenuator for attenuating the selected signal in response to a first attenuator control signal;
      a first optical-to-electrical converter for converting a first portion of the attenuated signal into an electrical data signal;
      a second optical-to-electrical converter for converting a second portion of the attenuated signal into a first power indication signal;
      a decision circuit for detecting high and low data bits in the electrical data signal based on a plurality of threshold voltage signals, and for providing decision signals indicative of the results of these determinations;
      an error monitoring circuit for receiving the decision signals, determining the bit error rate of the incoming optical signal for the plurality of threshold voltages, and providing bit error rate signals; and
      a microprocessor for receiving the power regulation signal and the bit error rate signals, and for generating a first attenuator control signal and a plurality of threshold voltage signals,
      wherein the variable attenuator operates to attenuate the selected signal such that it is at an optimal input level for the operation of the first optical-to electrical converter,
      wherein the microprocessor determines an optimal bit error rate and an optimal Q-factor for the selected signal based on the bit error rates of the selected signal for the plurality of threshold voltages.

2. A circuit for monitoring the Q-factor of a plurality of main signals being simultaneously transmitted across a fiber optic line, as recited in claim 1, wherein the plurality of main signals are transmitted over the fiber optic line using wave division multiplexing.

3. A circuit for monitoring the Q-factor of a plurality of main signals being simultaneously transmitted across a fiber optic line, as recited in claim 2, wherein the wave division multiplexing uses 100 MHZ spacings and employs 16 channels.

4. A circuit for monitoring the Q-factor of a plurality of main signals being simultaneously transmitted across a fiber optic line, as recited in claim 2, wherein the wave division multiplexing uses 50 GHz spacings.

5. A circuit for monitoring the Q-factor of a plurality of main signals being simultaneously transmitted across a fiber optic line, as recited in claim 2, wherein the optical tap is a 2% tap, providing the tapped signals with an amplitude of 2%, of the amplitude of the main signals.

6. A circuit for monitoring the Q-factor of a plurality of main signals being simultaneously transmitted across a fiber optic line, as recited in claim 2, wherein the filter is a tunable optical bandpass filter.

7. A circuit for monitoring the Q-factor of a plurality of main signals being simultaneously transmitted across a fiber optic line, as recited in claim 6, wherein the tunable optical bandpass filter cycles through a plurality of channel frequency bands respectively associated with the plurality of tapped signals, allowing the Q-detection circuit to determine the Q-factor for each of the plurality of tapped signals in turn.

8. A circuit for monitoring the Q-factor of a plurality of main signals being simultaneously transmitted across a fiber optic line, as recited in claim 7, wherein the tunable optical bandpass filter continually cycles through the plurality of channel frequency bands, thereby providing a constant stream of selected signals to the Q-detection circuit.

9. A circuit for monitoring the Q-factor of a plurality of main signals being simultaneously transmitted across a fiber optic line, as recited in claim 1, wherein the optical tap is a 1% to 5% tap, providing the tapped signals with an amplitude of 1% to 5% of the amplitude of the main signals.

10. A circuit for monitoring the Q-factor of a plurality of main signals being simultaneously transmitted across a fiber optic line, as recited in claim 1, wherein the wave division multiplexing employs between 40 and 96 channels.

11. A method for monitoring the Q-factor of a plurality of main signals being simultaneously transmitted across a fiber optic line, the method comprising:
   tapping the fiber optic line to provide a plurality of tapped signals corresponding to the plurality of main signals;
   selecting one of the plurality of tapped signals; and
   determining the Q-factor of the selected signal,
   wherein the determination of the Q-factor of the selected signal includes:
      attenuating the selected signal to a desired intensity;
      converting the attenuated signal to an electrical signal;
      determining the value of each of the data bits for each of a plurality of threshold voltages;
      determining a 1-bit error rate for identifying bits having a value of having a value of '0' in the step of determining the value of each of the data bits;
      determining a 0-bit error rate for identifying bits having a value '0' in the step of determining the value of each of the data bits;
      approximating a 1-bit error line of the logarithm of the 1-bit error rate versus the threshold voltage;
      approximating a 0-bit error line of the logarithm of the 0-bit error rate versus the threshold voltage;
      determining an intersection point at which the 1-bit error line and the 0-bit error line cross;

determining the ideal bit error rate corresponding to the intersection point; and calculating the Q-factor corresponding to the determined ideal bit error rate.

12. A method for monitoring the Q-factor of a plurality of main signals being simultaneously transmitted across a fiber optic line, as recited in claim 11, wherein the tapped signals have an amplitude of 1% to 5% of the amplitude of the main signals.

13. A method for monitoring the Q-factor of a plurality of main signals being simultaneously transmitted across a fiber optic line, as recited in claim 12, wherein the tapped signals have an amplitude of 2% of the amplitude of the main signals.

14. A method for monitoring the Q-factor of a plurality of main signals being simultaneously transmitted across a fiber optic line, as recited in claim 11, wherein the plurality of main signals are transmitted over the fiber optic line using wave division multiplexing.

15. A method for monitoring the Q-factor of a plurality of main signals being simultaneously transmitted across a fiber optic line, as recited in claim 14, wherein the wave division multiplexing uses 50 Hz spacings.

16. A method for monitoring the Q-factor of a plurality of main signals being simultaneously transmitted across a fiber optic line, as recited in claim 14, wherein the wave division multiplexing employs between 40 and 96 channels.

17. A method for monitoring the Q-factor of a plurality of main signals being simultaneously transmitted across a fiber optic line, as recited in claim 14, wherein the selection of one of the plurality of tapped signals is performed by filtering the plurality of tapped signals so that only a tapped signal in a particular channel frequency band is selected.

18. A method for monitoring the Q-factor of a plurality of main signals being simultaneously transmitted across a fiber optic line, as recited in claim 17, wherein the method repeats the selection of one of the plurality of tapped signals and the determination of the Q-factor of the selected signal through a plurality of channel frequency bands respectively associated with the plurality of tapped signals, allowing for the determination of the Q-factor for each of the plurality of tapped signals.

19. A method for monitoring the Q-factor of a plurality of main signals being simultaneously transmitted across a fiber optic line, as recited in claim 18, wherein the method continually repeats the selection of one of the plurality of tapped signals and the determination of the Q-factor of the selected signal, thereby continually and sequentially determining the Q-factor associated with each of the plurality of tapped signals.

20. A method for monitoring the Q-factor of a plurality of main signals being simultaneously transmitted across a fiber optic line, as recited in claim 14, wherein the wave division multiplexing uses 100 MHZ spacings and employs 16 channels.

* * * * *